Nov. 19, 1940.    R. L. LÉVY    2,221,979
AUTOMATIC LOCKING DEVICE FOR PISTONS AND THE LIKE
Filed April 7, 1939    2 Sheets-Sheet 1
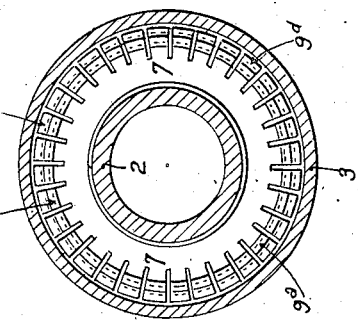
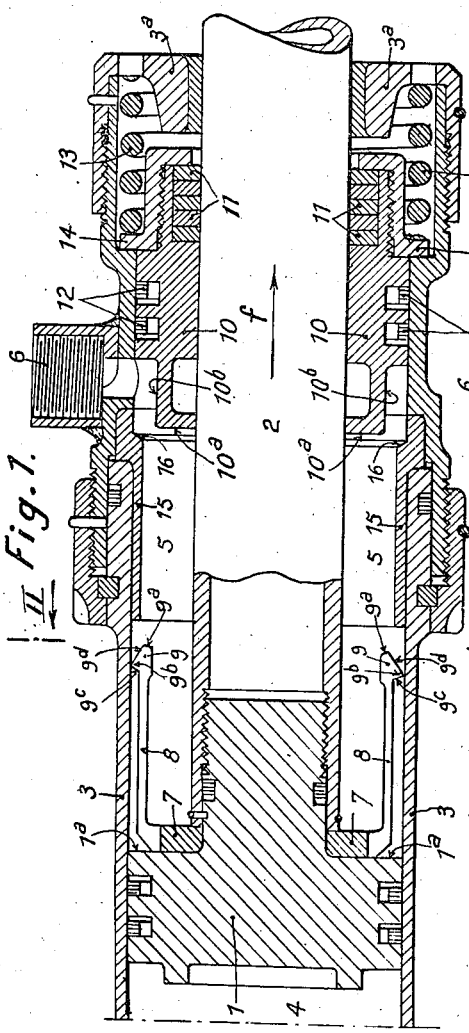
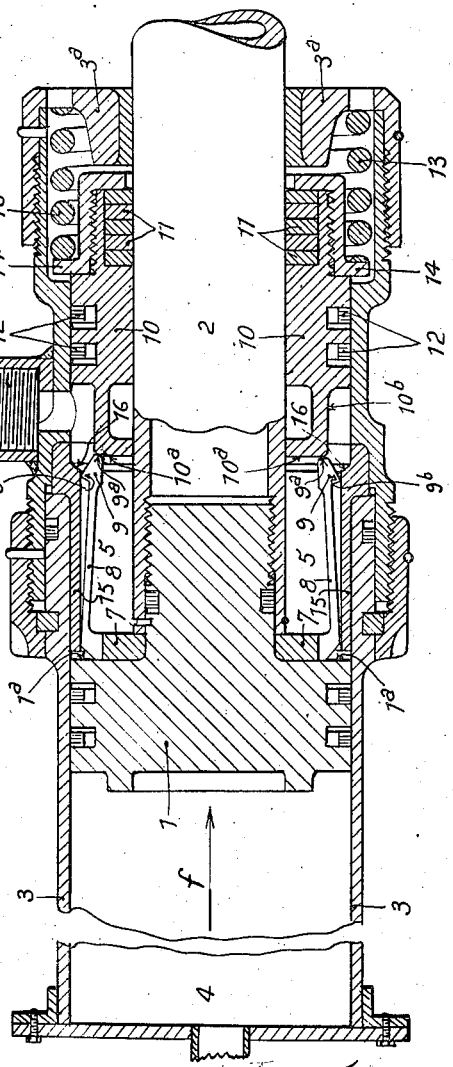

Nov. 19, 1940.  R. L. LÉVY  2,221,979
AUTOMATIC LOCKING DEVICE FOR PISTONS AND THE LIKE
Filed April 7, 1939  2 Sheets-Sheet 2
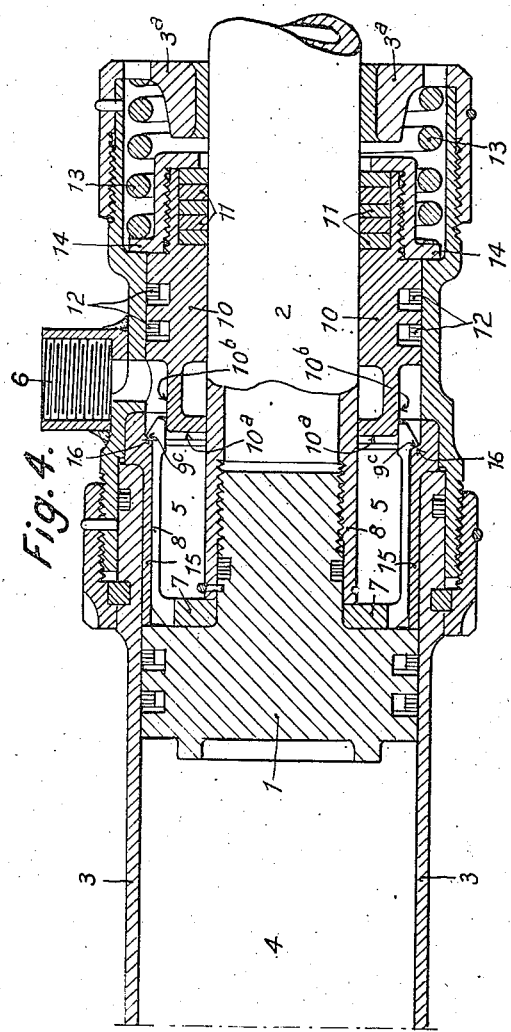

Patented Nov. 19, 1940

2,221,979

UNITED STATES PATENT OFFICE 2,221,979

AUTOMATIC LOCKING DEVICE FOR PISTONS AND THE LIKE

René Lucien Lévy, Paris, France, assignor to Société d'Inventions Aéronautiques et Mécaniques S. I. A. M., Fribourg, Switzerland Application April 7, 1939, Serial No. 266,673
In France April 11, 1938

2 Claims. (Cl. 121—40)

The invention relates to a device which is adapted to effect the automatic locking of a part, such as a piston, having a relative movement with respect to another part, for example a cylinder. The invention is adapted to be used in systems wherein said movement is imparted by hydraulic means.

The necessity of an absolutely reliable automatic locking at one or a plurality of predetermined points of the stroke of a piston or equivalent device, is particularly important in jacks or other telescopic systems applied to certain types of retractable undercarriages for aeroplanes.

Certain ball devices have already been proposed or used for effecting the locking of pistons, but the application of such devices to jacks of small size, which are frequently used in the case of high pressures, is fraught with difficulties since the balls, the number of which is in this case necessarily reduced, individually support relatively great stresses owing to which they eventually become impressed in the part they are intended to lock, so that play develops in the locking.

The present invention consists in a mechanical locking device which is capable of being locked or unlocked by a control action effected by hydraulic or pneumatic means, and said invention is characterized by the combination of the following means:

(1) A resilient sleeve provided with claws, which is secured to the member to be locked, for example a piston or equivalent device;

(2) A guide-surface which is secured to the fixed member (cylinder or equivalent device) and produces the momentary contraction of said sleeve, before locking;

(3) A slide subjected to the action of a resilient force, such as a spring, said slide being adapted to be encountered and pushed back by said sleeve in the contracted state and first of all to move backwards before said sleeve, until the edge of the claws of the latter has reached a fixed releasing slope which allows the sleeve to expand resiliently again, so that responsive to the action of said spring, the slide moves along inside the sleeve and locks said claws against the releasing slope;

(4) For unlocking, means which enable a fluid under pressure to be conveyed between the sleeve and the slide.

A locking device having these features is illustrated by way of a constructional example in the accompanying drawings in which:

Fig. 1 shows an axial section of a piston and cylinder system, with the device according to the invention, before locking.

Fig. 2 shows a sectional view along the plane projected on II—II in Fig. 1, so as to show an end view of the sleeve provided with claws.

Fig. 3 shows a sectional view corresponding to Fig. 1, but at the instant immediately before locking.

Fig. 4 is a view corresponding to Fig. 1, after locking.

The piston 1, which is secured to the rod 2, moves in one direction or the other inside a cylinder 3, for example by the action of a fluid under pressure introduced into one or other of the compartments 4 or 5 of the cylinder, alternately through inlet and exhaust pipes 6.

It is assumed that at the end of its stroke towards the right (direction of the arrow $f$), the locking device has to prevent the piston from moving backwards.

For this purpose, according to the invention, against the face $1^a$ of the piston is fixed a resilient sleeve provided with claws, which is formed by a collar 7 from which project resilient arms 8 that terminate in claws 9. Said sleeve may be obtained by providing, in the cylindrical part of a primary cup-shaped metal member, the collar 7 of which forms the end, a series of radial slots directed along the axis. These slots separate a series of resilient arms each terminating in a claw, the body of which is so shaped as to have an end forming a pusher $9^a$, and an outer peripheral edge $9^b$ which limits an engaging edge $9^c$ and a contracting slope $9^d$.

Towards the locking point is mounted, in the cylinder 3, a slide 10 with fluid-tight packings 11 and 12 which are in contact respectively with the piston rod and with the inner wall of the cylinder. Said slide is subjected to the action of a spring 13 which bears, against the end $3^a$ of the cylinder, and against the collar 14 of a fitting interposed between the slide and its spring.

In the cylinder, and before the slide, for the direction of movement $f$, is fixed a cylindrical guide surface 15 followed by a releasing slope 16.

The operation of this locking device is as follows:

At a certain point of the stroke of the piston 1 in the direction $f$, the claws 9 encounter, with their contracting slopes $9^d$, the guide surface 15 which then compels the resilient arms 8 of the sleeve to bend towards the axis of the cylinder. As the piston continues its stroke in the same direction, the claws come into contact with the front face 10ª of the slide which is then pushed back by the front faces 9ª of the claws, while the spring 13 is gradually compressed.

At the instant when the edges 9ᵇ of the claws reach the end of the guide surface 15 and engage the releasing slope 16 (Fig. 3), the contracting action which was being exerted on the resilient arms of the sleeve gradually decreases and finally ceases at the instant when the engaging edges 9ᶜ are pressed against the said slope 16, the sleeve having returned to its normal shape owing to the resilience of its arms.

Responsive to the spring 13, the slide moves forward in the opposite direction to the arrow $f$ and its wall 10ᵇ is introduced into the sleeve and supports the inside of the claws so that any accidental backward movement of the piston in the opposite direction to the arrow $f$ is absolutely prevented (Fig. 4), since the contraction of the sleeve, which must be the necessary condition before such backward movement could occur, is prevented by the presence of the slide.

In order to unlock the system, it suffices to send a fluid under pressure into the pipe 6 shown in the drawings.

The action of said fluid first of all has the effect of pushing back the slide 10 in the direction $f$, compressing the spring 13. At the instant when the face 10ª of the slide has passed beyond the ends of the claws 9, said sleeve recovers its freedom of centripetal contraction. The action of the fluid on the main piston 1, in the compartment 5, then displaces said piston in the opposite direction to the arrow $f$, the edges 9ᶜ of the claws sliding along the releasing slope 16, owing to the suitably chosen inclination of the contacting surfaces. Finally, the claws slide along the surface 15, reach the beginning of same, and the sleeve having passed over the said guide surface, can expand again and return to its initial shape.

I claim:

1. A mechanical locking device for pistons and the like that are adapted to move relatively to another member such as a cylinder, comprising in combination a resilient sleeve forming claws and secured to the movable member, a guide surface secured to the fixed member and adapted to co-operate with said sleeve to produce a momentary contraction of same before locking, an expanding slope on said fixed member, a slide mounted in said fixed member, resilient means for urging said slide towards said sleeve, said sleeve when contracted being adapted to encounter said slide and drive same back until the edge of said claws reaches said expanding slope which allows said resilient sleeve to expand so that, responsive to said resilient means, said slide engages inside the sleeve and holds said claws against the expanding slope, thereby preventing the return movement of said movable member.

2. Mechanical locking device according to claim 1, wherein means are provided for introducing a fluid under pressure between the movable member and the slide, thereby to unlock said movable member.

RENÉ LUCIEN LÉVY.